No. 704,429. Patented July 8, 1902.
F. BARTO.
AUTOMATIC WEIGHING MACHINE.
(Application filed Oct. 10, 1901.)
(No Model.) 5 Sheets—Sheet 1.
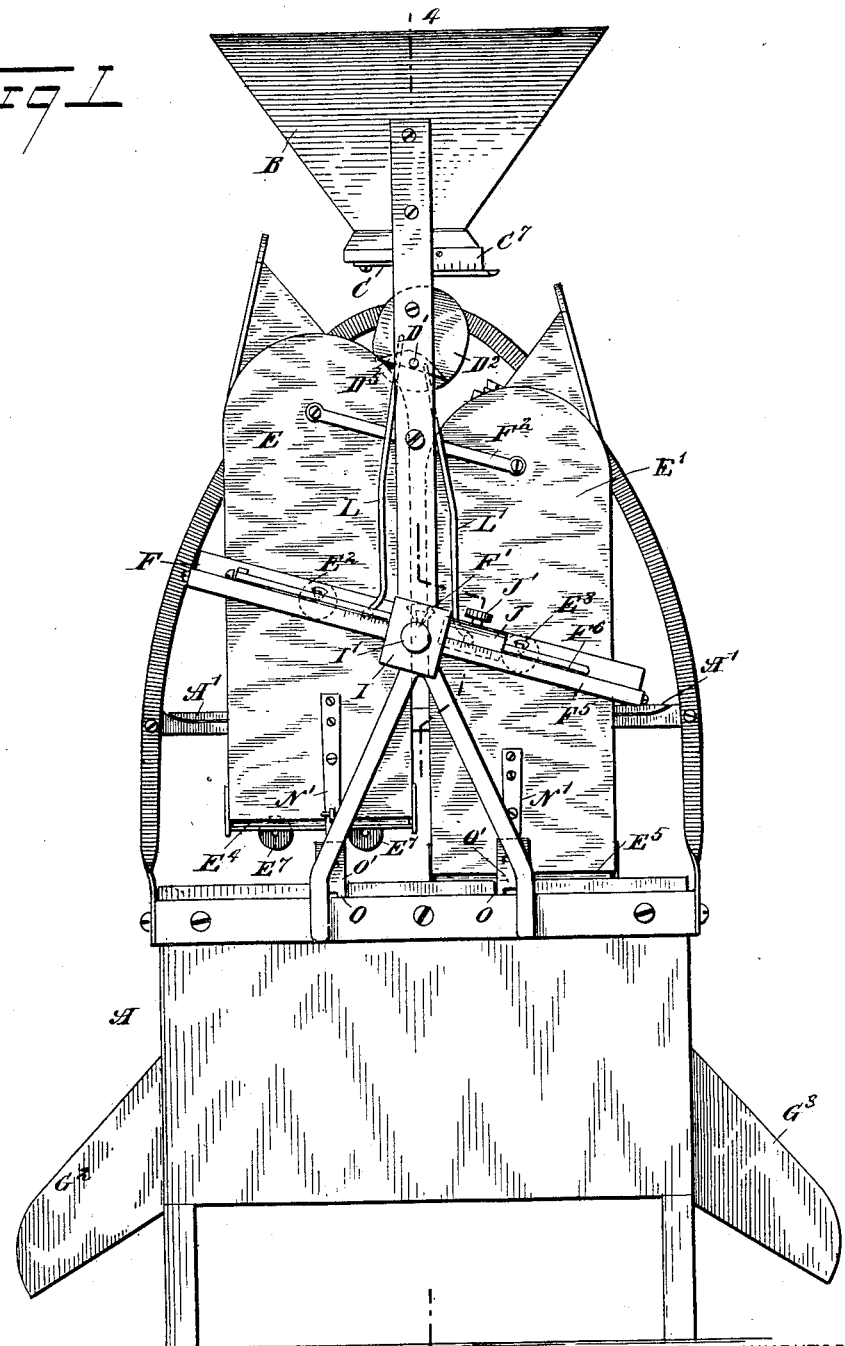
WITNESSES:
INVENTOR
Frank Barto
BY
ATTORNEYS

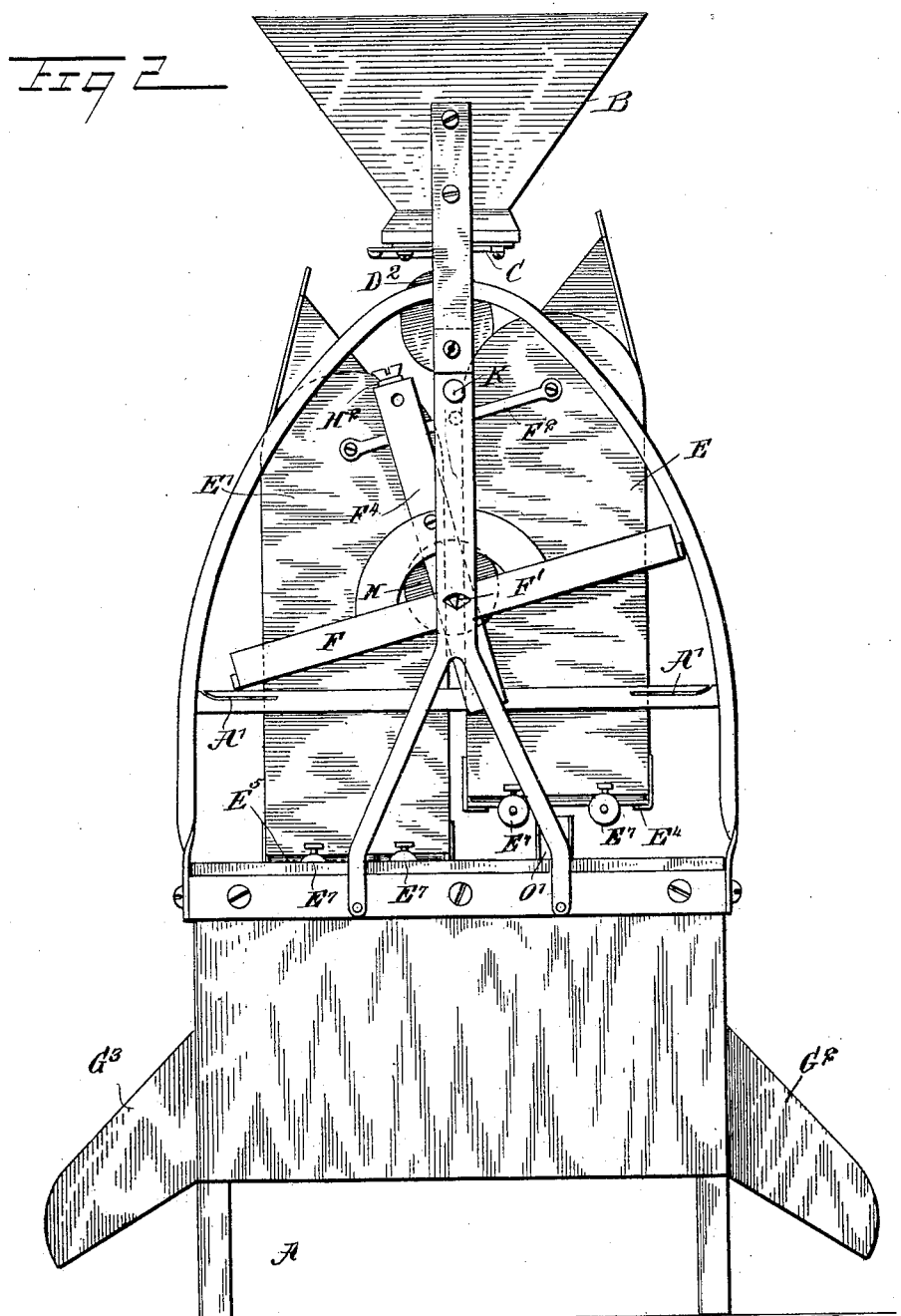

No. 704,429. Patented July 8, 1902.
F. BARTO.
AUTOMATIC WEIGHING MACHINE.
(Application filed Oct. 10, 1901.)
(No Model.) 5 Sheets—Sheet 3.
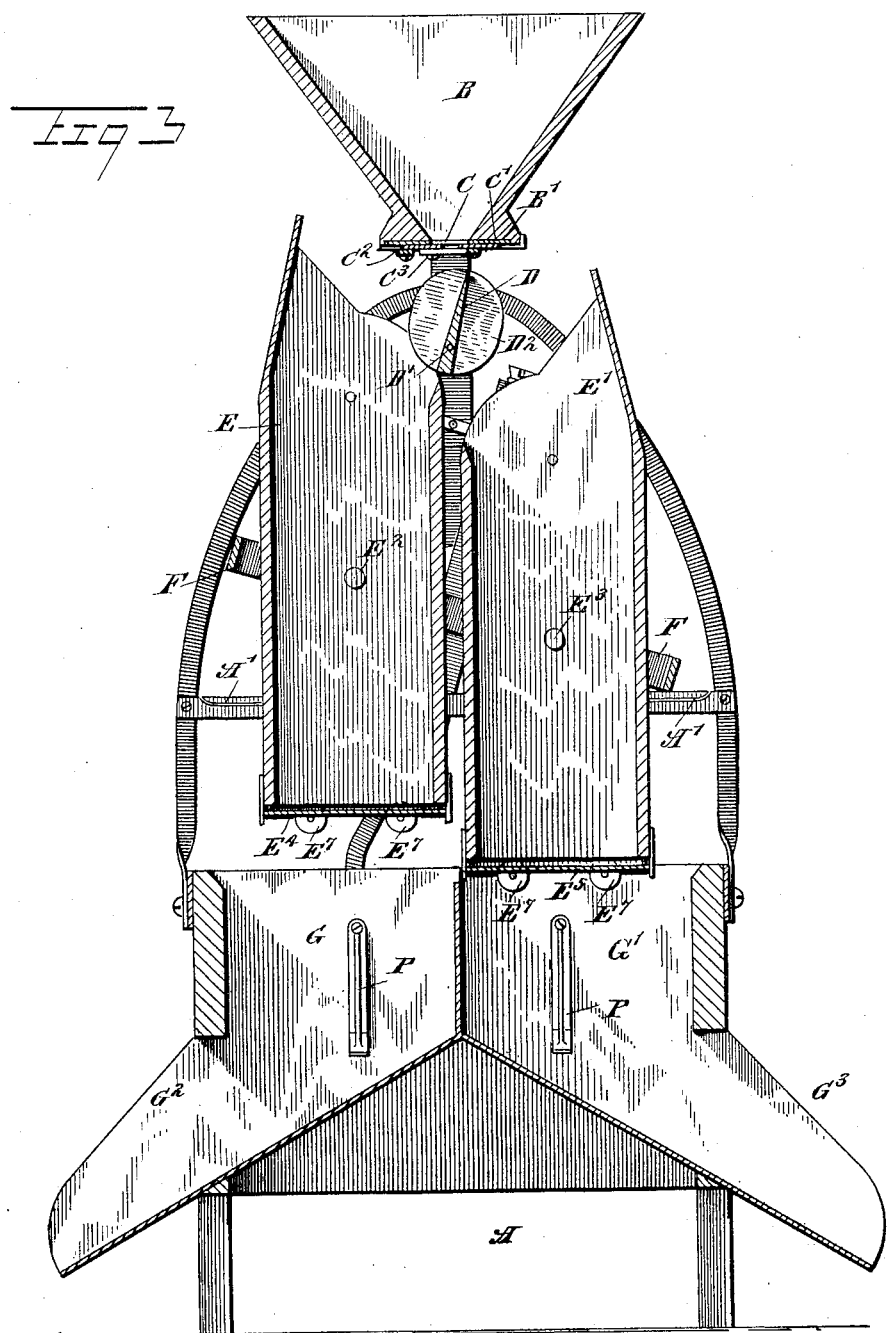
WITNESSES:
INVENTOR
Frank Barto
BY
ATTORNEYS

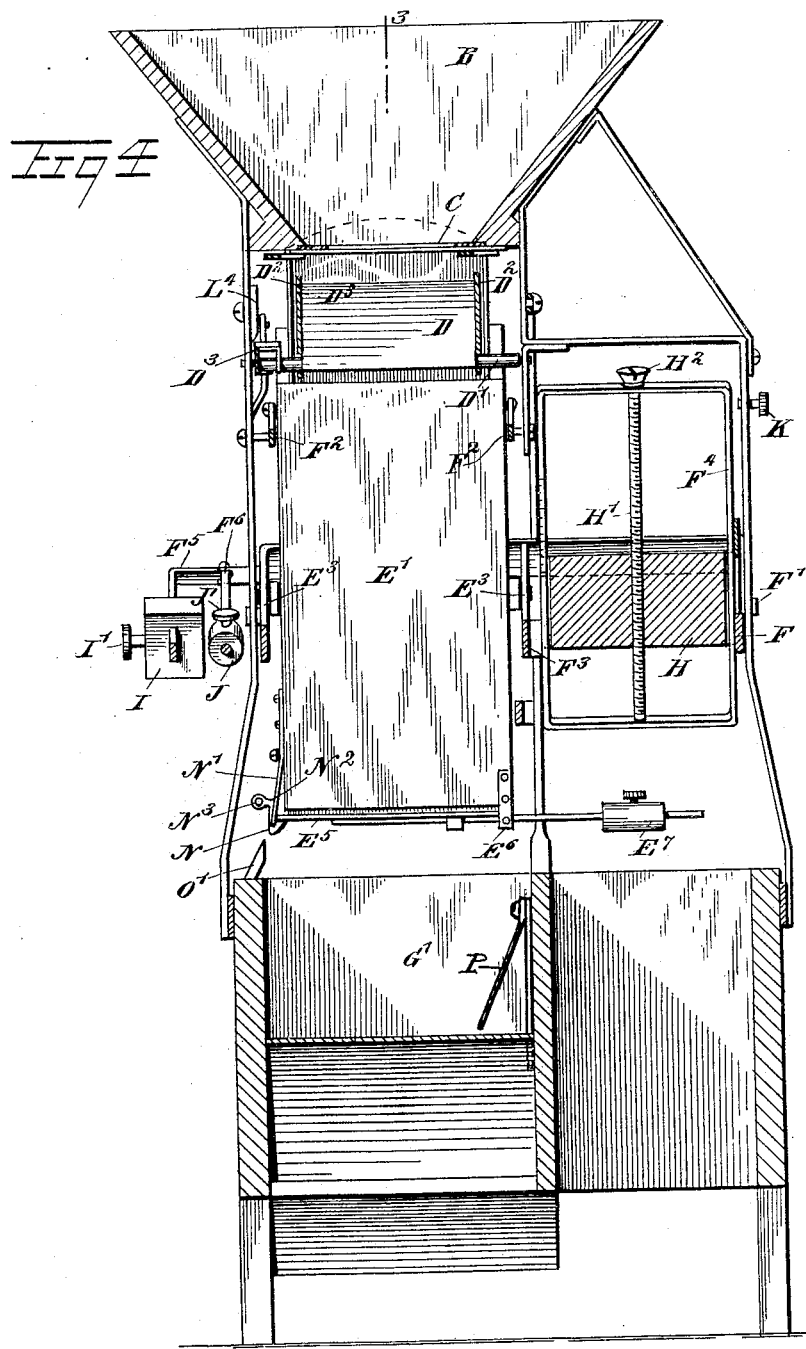

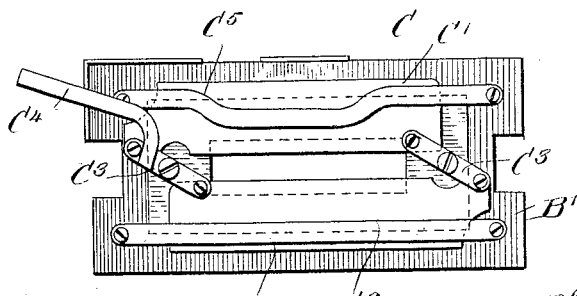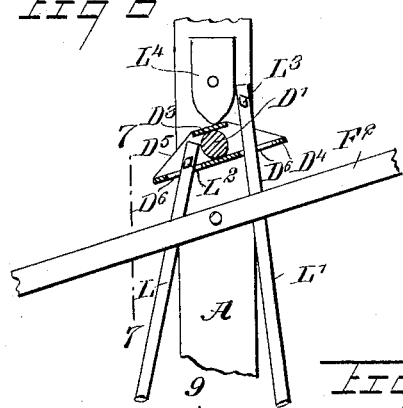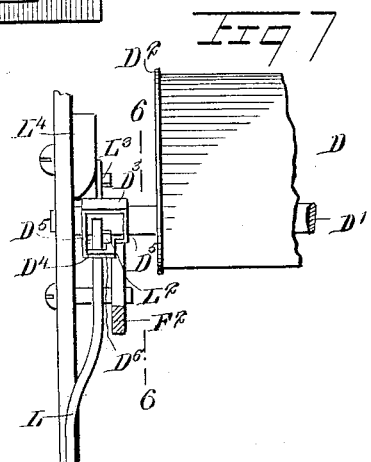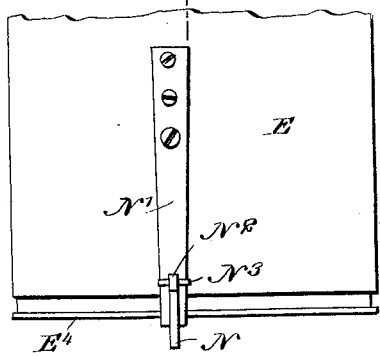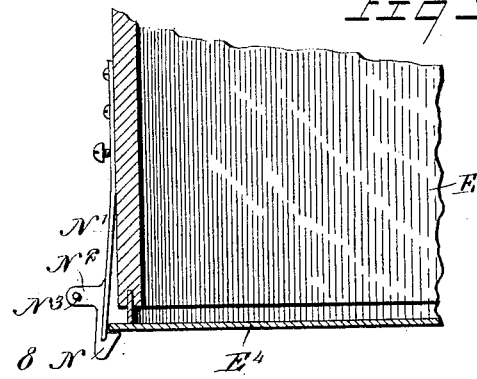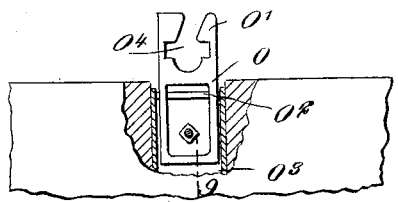

UNITED STATES PATENT OFFICE.

FRANK BARTO, OF ISLIP, NEW YORK.

AUTOMATIC WEIGHING-MACHINE.

SPECIFICATION forming part of Letters Patent No. 704,429, dated July 8, 1902.

Application filed October 10, 1901. Serial No. 78,190. (No model.)

*To all whom it may concern:*

Be it known that I, FRANK BARTO, a citizen of the United States, and a resident of Islip, in the county of Suffolk and State of New York, have invented new and useful Improvements in Automatic Weighing-Machines, of which the following is a full, clear, and exact description.

The invention relates to apparatus for weighing or measuring grain and other substances; and its object is to provide a new and improved automatic weighing-machine arranged to permit of minute adjustment of the parts, to insure accurate weighing, either for weighing the material successively in equal quantities or in unequal quantities, and for delivering the measured quantities to separate receptacles.

The invention consists of novel features and parts and combination of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a front elevation of the improvement. Fig. 2 is a rear elevation of the same. Fig. 3 is a sectional side elevation of the same on the line 3 3 of Fig. 4. Fig. 4 is a transverse section of the same on the line 4 4 of Fig. 1. Fig. 5 is an enlarged inverted plan view of the closing device for the hopper. Fig. 6 is an enlarged sectional front elevation of the tilting device for the flap-valve, the section being on the line 6 6 of Fig. 7. Fig. 7 is a side elevation of the same, the beam being in section on the line 7 7 of Fig. 6. Fig. 8 is a rear elevation of the locking and releasing device for the drop-bottom of the hopper, part being in section on the line 8 8 of Fig. 9; and Fig. 9 is a transverse section of the same on the line 9 9 of Fig. 8.

On the upper end of a suitably-constructed frame A is secured a hopper B, provided at its spout or outlet with a manually-controlled closing device C, which when opened allows the grain or other material contained in said hopper to flow from the latter by its own gravity over a flap-chute D into either of the receptacles E and E', according to the position of the said chute D. The front and rear sides of the receptacles E and E' are hung at or near their middles by centers $E^2$ and $E^3$ on a beam F, hung on centers F' on the main frame A, and said receptacles are pivotally connected with each other at their front and rear sides and near the tops of the receptacles by links $F^2$, fulcrumed on the main frame A. By the arrangement described the tilting of the beam F causes a vertical up-and-down movement of the receptacles E and E'—that is, when one receptacle moves down the other moves up, and vice versa—and the two receptacles always move in parallel lines. The lower ends of the receptacles E and E' are normally closed by drop doors or bottoms $E^4$ and $E^5$, respectively, which when opened discharge the accumulated contents of the receptacles into the bins G G', arranged in the lower portion of the frame A and provided with outlet-spouts $G^2$ and $G^3$ for delivering the material to bags or other vessels.

The beam F is preferably in the form of a rectangular open frame, through which extend the receptacles E E', the open frame extending beyond the rear of the receptacles, and a bar $F^3$ reaches from one side of the frame to the other, the rear centers $E^2$ and $E^3$ being hung in the said bar. On the bar $F^3$ and the rear bar of the frame, at the middle thereof, is secured or formed an auxiliary frame $F^4$, standing at right angles to the centers F', and on this frame $F^4$ (see Fig. 4) is mounted to slide up and down a poise H, preferably in the shape of a solid cylinder of metal or other heavy material. A screw-rod H' screws in the poise H and is journaled at the top and bottom in the upper and lower bars of the auxiliary frame $F^4$, so that when the operator turns the head $H^2$ of the screw-rod H' the poise H is forced to slide up or down on the auxiliary frame $F^4$, according to the direction in which the screw-rod H' is turned. The poise H indicates on a suitable graduation on one of the upright bars of the auxiliary frame $F^4$, and by adjusting said poise H with its center farther away from or nearer to the centers F' greater or lesser amounts of material can be weighed in the receptacles E and E'. By the use of the poise H equal amounts of material are weighed or measured in the receptacles E and E'; but in order to weigh more for one receptacle than for the other an auxiliary poise I is provided, held to slide longitudinally on a bar $F^5$, secured to the beam F, at the front thereof, the poise I being adapted to be secured in place after proper adjustment is made by a set-screw I'. (See Fig. 4.) Now it is evident that when this poise I is moved out of a central position to either the right or the left (see Fig. 1) then the corresponding receptacle E or E' is weighted more than the other receptacle, and consequently the tilting of the beam F and the corresponding up-and-down movement of the receptacles E and E' take place at unequal times with different loads of material in the said receptacles.

In order to properly counterbalance the beam F and the receptacles E and E' and parts connected therewith, I provide a counterbalancing-weight J, held adjustably on a bar $F^6$, secured to the beam F, at the front thereof, and in the rear of the bar $F^5$. The said counterbalancing-weight J is secured in position on the bar $F^6$ after the desired counterbalancing adjustment has been made by a set-screw J'. In order to lock the beam F and the receptacles E and E' in position when the apparatus is not in use, a screw K is provided, screwing in the frame A and engaging an aperture in the auxiliary frame $F^4$, so as to hold the latter in a vertical position against movement to either the right or the left.

In order to actuate the flap-chute D, the following construction is provided: The flap-chute D is preferably made triangular in cross-section, as is plainly shown in Fig. 3, and the base end of the chute is secured on a shaft D', journaled in suitable bearings carried by the main frame A. Flanges $D^2$ extend at the ends of the flap-chute on opposite sides thereof, so as to prevent any material coming down the chute B from being spilled to the front or rear of the machine during the flow of the material to the receptacles E and E'. On the front end of the shaft D' (see Figs. 6 and 7) are secured plates $D^3$ and $D^4$, located on the top and bottom of the shaft and connected with each other at their ends by plates $D^5$, as is plainly indicated in Fig. 7. Two rods L and L' are pivotally connected with the beam F at opposite sides of the center F', (see Fig. 1,) and the upper ends of the said rods extend loosely through elongated apertures $D^6$, formed in the bottom plate $D^4$. Near the upper ends of the rods L and L' are arranged transversely-extending lugs $L^2$ $L^3$, respectively, adapted to engage the top of the plate $D^4$ during the downward movement of the rod, so as to lock the plate $D^4$, and consequently the shaft D' and flap-chute D, against turning during the time this particular rod is in the lowermost position. The upper ends of the rods L and L' are adapted to engage the under side of the top plate $D^3$ at the time the rod L moves upward on the swinging of the beam F, so that this upper end of the rod while moving upward pushes on the plate $D^3$, so as to turn the shaft D' and with it the flap-chute D, to shift the latter from one side to the other. During this upward movement of one rod L the other rod moves downward, and in doing so its upper end finally passes below the corresponding end of the top plate $D^3$, and its lug $L^3$ then engages the upper side of the bottom plate $D^4$ to hold the flap-chute D against accidental turning over until another shifting of the beam F takes place. Thus when the several parts are in the position shown in Figs. 6 and 7 and the left-hand end of the beam F is down, then the chute D is held against movement by the lug $L^2$ resting on the upper side of the bottom plate $D^4$. Now when the beam begins to swing with the left-hand end upward then the upper end of the rod L pushes against the under side of the plate $D^3$, so that the shaft D' is turned and the chute D flaps over to the other side. During this upward movement of the rod L the rod L' moves downward, and thereby assumes a position similar to that of the rod L, as shown in Fig. 6, so that on the next movement of the beam F with the right-hand end traveling upward the rod L' shifts the chute D from one side to the other. During the upward movement of the rod L or L' the upper end finally glides over the edge of the top plate $D^3$ onto the sides of a fixed cam $L^4$, secured to the frame A, so as to hold the upper end of this corresponding rod out of engagement with the plate $D^3$ to regulate the tilt of the shaft D' and to allow the rod a proper downward movement on the next changing of the beam F, so as to rapidly drop in under the top plate $D^3$, as previously explained.

The drop bottoms or doors $E^4$ and $E^5$ for the receptacles E and E' are alike in construction and each is pivoted at $E^6$ to the under side of the corresponding receptacle and is provided with an adjustable counterbalancing-weight $E^7$ to normally hold the drop-bottom in a balanced position. A catch N is adapted to engage the free end of each of the drop-bottoms $E^4$ and $E^5$ to lock the said drop-bottoms in a closed position, as shown in Figs. 4, 8, and 9, and said catch N is held on the free end of a spring N', secured to the front of the corresponding receptacle E and E'. The forward projection $N^2$ on the catch N carries a cross-pin $N^3$, located a distance above the lower end of the catch, as is plainly indicated in the figures referred to. This pin $N^3$ is adapted to engage the upper inwardly-inclined end O' of a trip O, fulcrumed at $O^2$ on a bracket $O^3$, secured to the casing A, as is plainly shown in Figs. 8 and 9, and in the upper inclined end O' of the said trip is formed a cross-shaped slot $O^4$ to allow the pin $N^3$ to pass through the cross-arms of the said slot during the downward movement of the catch N. The lower end of the trip O rests against its bracket $O^3$, so as to hold the trip against further downward swinging during the time the pin $N^3$ moves downward into engagement with the said incline O'; but when the pin N³ moves upward the trip is free to swing outward at its upper end until the pin N³ has cleared the trip, and then the latter swings back to its normal position, as shown in Figs. 4 and 9. When the receptacle E or E' moves downward with its door locked in place and the receptacle is filled with the desired amount of material, then during the downward movement of this receptacle the pin N³ finally comes in contact with the inclined end O' of the trip O, so that the catch N is moved outwardly against the tension of its spring N' away from the free end of the corresponding drop-bottom E⁴ or E⁵, whereby the bottom is released, and the material in the receptacle pressing against the drop-bottom now causes the latter to swing into an open position. When this takes place, the lower end of the corresponding receptacle E or E' is within the upper end of the bin G or G', so that the contents of the receptacle now pass into the said bin. After the drop-bottom is released the pin N³ passes through the cross-arms of the slot O⁴ to disengage the trip O, which now swings back by its own weight to its normal position, and the catch N swings back to its normal position by the action of its spring N'. As soon as the contents of the receptacle E or E' have passed into the corresponding bin then the counterbalancing-weight E⁷ causes the drop-bottom to swing into a closed position and in doing so the free end of the drop-bottom pushes the catch N outward until it passes the catch, and then the catch returns to a locking position by means of its spring N'. The drop-bottom is now again locked in a closed position.

In order to limit the downward swinging of the drop-bottoms E⁴ and E⁵, a spring-arm P is provided in the corresponding bin G or G' for the free end of the drop-bottom to strike against. As soon as the contents of the receptacle has passed over the open bottom into the bin then the reaction of the spring-arm P starts the bottom E⁴ or E⁵ on its return or closing movement to insure a positive closing of the door by the counterweight E⁷.

The valve C on the under side of the hopper B is constructed as follows, (see Fig. 5:) On the under side of the apertured bottom plate B' of the hopper are held to slide toward and from each other the valve-plates C' and C², adapted to meet with their inner edges approximately at the middle of the opening in the bottom plate B'. The valve-plates C' and C² are pivotally connected with each other near their ends by parallel levers C³, fulcrumed on the bottom plate, and one of the said levers C³ is provided with a handle C⁴, under the control of the operator to impart a swinging motion to the said lever to move the plates C' and C² toward and from each other, according to the direction in which the handle C⁴ is moved. The valve-plates C' and C² are mounted to slide on the top of guides C⁵, secured to the bottom plate B', as is plainly indicated in Fig. 5.

The operation is as follows: When the several parts of the machine are in the position illustrated in Figs. 1, 2, 3, and 4, then the machine will weigh equal amounts of the material in the receptacles E and E', it being understood that in this case the poise I is in a central position relative to the centers F', as indicated in Fig. 1, while the center of the poise H is a distance above the centers F'. Now when the operator opens the valve C the material contained in the hopper B flows through the flap-chute D into the uppermost receptacle E, and when the amount of material accumulating in the receptacle E corresponds to the amount the poise H is set to then the receptacle E will move downward, thereby imparting a swinging motion to the beam F. Shortly after the beginning of the downward movement of the receptacle E the rod L' imparts a swinging motion to the flap-chute D, so that the latter is shifted and the material is cut off from the receptacle E and is now directed into the receptacle E'. During the further downward movement of the receptacle E its drop-bottom E⁴ is unlocked and the contents of the receptacle are discharged into the bin G, as previously explained, after which the bottom swings back into a locked position, as above explained. During this time the material is accumulating in the receptacle E', and when the desired amount has accumulated this receptacle will move downward and the above-described operation will be repeated—that is, the rod L will shift the flap-chute D back to the position shown in Fig. 1 to cut off the material from the receptacle E' and to direct it back to the receptacle E. The bottom E⁵ is released during this downward movement and the contents of the receptacle E' are discharged into the bin G'. When it is desired to weigh unequal amounts in the receptacles E and E', then the operator shifts the poise I correspondingly along the graduated bar F⁵ to the desired position. Now it is evident that when the material flows from the hopper B over the flap-chute D alternately into the receptacles E and E' it requires a larger amount in that receptacle which is overbalanced by the poise I than is required in the receptacle balanced by the said poise. The arrangement of the valve C permits the operator to graduate the valve-opening to such an extent as to insure a proper flow of the material, according to the nature thereof, the arms C⁴ being shifted by the operator along the graduations C⁷, (shown in Fig. 1,) which indicates the size of the valve-opening. The downward-swinging motion of the side arms of the beam F is limited by the said side arms striking spring-tongues A' on the frame A. (See Figs. 1 and 2.)

Having thus described my invention, I claim as new and desire to secure by Letters Patent—

1. In an automatic weighing-machine, the combination with a hopper, a scale-beam and suitable receptacles under the control of said scale-beam, of a shiftable stream-deflector, and connecting-rods between said beam and the stream-deflector, said connecting-rods located on opposite sides of the axes of movement of said deflector and the scale-beam and operable to shift the deflector immediately following the beginning of the descent of either loaded receptacle, whereby the deflector is at once shifted when the receptacle is fully loaded.

2. In an automatic weighing-machine, the combination with a hopper, a scale-beam and suitable receptacles under the control of said scale-beam, of a shiftable stream-deflector, and connecting-rods between said beam and the stream-deflector, said connecting-rods being movable endwise and in opposite directions simultaneously, one rod on the descent of one loaded receptacle acting to immediately shift the stream-deflector and the other rod serving to lock the stream-deflector in its changed position.

3. In an automatic weighing-machine, the combination with a hopper, a scale-beam and suitable receptacles under the control of said scale-beam, of a shiftable stream-deflector, and connecting-rods between said beam and the stream-deflector, said connecting-rods acting alternately on the stream-deflector and with a pushing movement and on opposite sides of the axis of adjustment of said stream-deflector.

4. In an automatic weighing-machine, the combination with a hopper, a scale-beam and suitable receptacles under the control of said scale-beam, of a shiftable stream-deflector, and connecting-rods between said beam and the stream-deflector, said connecting-rods being slidably fitted to the stream-deflector and having projections arranged to act against said deflector on the up-and-down movements of said rods, and means disposed in the path of the rod projections and operable to disengage the latter temporarily from operative connection with the shifter.

5. In an automatic weighing-machine, the combination with a scale-beam, of receptacles carried thereby and having hinged drop-bottoms each provided with a closing device, a catch for normally locking the drop-bottom in a closed position, and a trip in the path of said catch, said trip having a slotted part disposed in the path of the catch and yieldable upwardly to allow the bottom to be closed immediately following the discharge of the load.

6. In an automatic weighing-machine, the combination with a scale-beam, and receptacles controllable thereby, of hinged bottoms to said receptacles, a catch for locking each bottom in a closed position, a trip disposed in the path of each catch, said trip being yieldable freely in one direction and allowing the bottom to be closed immediately following the discharge of the load from the receptacle, and means for closing the bottom while the receptacle is lowered and independently of the position or action of the companion receptacle.

7. A weighing-machine having a shifting and locking device for a stream-deflector, comprising rods mounted to move alternately up and down on opposite sides of the stream-deflector shaft, each of the rods having a lug below its upper end, and plates on the stream-deflector shaft projecting at opposite sides thereof and adapted to be engaged by the said rods and their lugs, as set forth.

8. A weighing-machine having a shifting and locking device for a stream-deflector, comprising rods mounted to move alternately up and down on opposite sides of the stream-deflector shaft, each of the rods having a lug below its upper end, and plates projecting from the stream-deflector shaft at opposite sides thereof, the said lugs being located above and below the axis of the stream-deflector shaft and the lower plate having slots for guiding the rods, as set forth.

9. A weighing-machine having a shifting and locking device for a stream-deflector, comprising rods mounted to move alternately up and down on opposite sides of the stream-deflector shaft, each of the rods having a lug below its upper end, and plates projecting from the stream-deflector shaft at opposite sides thereof, the said lugs being located above and below the axis of the stream-deflector shaft and the lower plate having slots for guiding the rods, the ends of the rods being adapted to engage the under side of the upper plate and the lugs on the said rods being adapted to rest on top of the lower plate, as set forth.

10. In an automatic weighing-machine, the combination with a movable load-receiver, and a drop-bottom therefor, of a catch for said bottom, and a trip disposed in the path of said bottom, said trip occupying a fixed relation to the downward movement of the catch and being yieldable freely to impingement of the catch on the upward movement of said load-receiver.

11. A weighing-machine having a receptacle and a drop-bottom therefor, hinged to the receptacle at one side, a locking-catch on the receptacle for engaging the free end of the drop-bottom, and a releasing device for the catch, to open the latter on the downward movement of the receptacle, said releasing device consisting of a trip having an inclined upper end formed with a slot, the lower end of the trip being held against movement in one direction, and a pin carried by the said catch and adapted to engage the said inclined end, to swing the catch out of engagement with the free end of the bottom, the pin being also adapted to pass through the end of the slot, as set forth.

12. A weighing-machine having a receptacle and a drop-bottom therefor hinged to the receptacle at one side, a locking-catch on the receptacle for engaging the free end of the drop-bottom, a releasing device for the catch to open the latter on the downward movement of the receptacle, a counterbalancing-weight for the drop-bottom, and a fixed spring-arm acting as a stop for the said drop-bottom, and also acting to start the bottom on its return or closing movement, as set forth.

13. A weighing-machine, having a hopper, and a valve on the discharge end of said hopper, said valve comprising two slidable plates mounted to move toward and from each other and across said discharge end, centrally-fulcrumed levers pivoted to said valve-plates and adapted to impart equal play thereto and to maintain said valve-plates in parallel relation, and an arm projecting from one of said valve-plates.

14. In an automatic weighing-machine, the combination with a frame, a hopper, and a stream-deflector, of a bail-shaped scale-beam fulcrumed on the frame and provided at its rear side with a right-angular extension, receptacles in said scale-beam in front of the extension thereof and pivoted to the beam, a link pivoted to the frame and to said receptacles to maintain the latter in parallel relation to each other, and a vertically-shiftable poise mounted in said extension of the bail-shaped scale-beam.

15. In an automatic weighing-scale, the combination of a bail-shaped scale-beam, provided at its rear side with a vertically-shiftable poise and having the longitudinal bars or rods $F^5$, $F^6$ receptacles pivoted within the scale-beam, a counterbalancing-poise adapted to be fixed on one bar or rod, a supplementary poise shiftable to variable positions on the other bar or rod, a hopper, and a shiftable stream-deflector.

In testimony whereof I have signed my name to this specification in the presence of two subscribing witnesses.

FRANK BARTO.

Witnesses:
 THEO. G. HOSTER,
 EVERARD B. MARSHALL.